(12) United States Patent
Kim et al.

(10) Patent No.: US 11,380,987 B2
(45) Date of Patent: Jul. 5, 2022

(54) ANTENNA-INTEGRATED BASE STATION APPARATUS AND ANTENNA FIXING EQUIPMENT OF MOBILE COMMUNICATION NETWORK

(71) Applicant: KMW INC., Hwaseong-si (KR)

(72) Inventors: In-Ho Kim, Hwaseong-si (KR); Oh-Seog Choi, Hwaseong-si (KR); Hee Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 21 days.

(21) Appl. No.: 17/121,785

(22) Filed: Dec. 15, 2020

(65) Prior Publication Data
US 2021/0098872 A1  Apr. 1, 2021

Related U.S. Application Data

(60) Division of application No. 16/039,344, filed on Jul. 19, 2018, now Pat. No. 10,897,078, which is a
(Continued)

(30) Foreign Application Priority Data

Jan. 22, 2016 (KR) ........................ 10-2016-0008310

(51) Int. Cl.
*H01Q 3/08* (2006.01)
*H01Q 3/04* (2006.01)
(Continued)

(52) U.S. Cl.
CPC ................ *H01Q 3/08* (2013.01); *H01Q 1/02* (2013.01); *H01Q 1/08* (2013.01); *H01Q 1/12* (2013.01);
(Continued)

(58) Field of Classification Search
CPC .. H01Q 3/08; H01Q 3/04; H01Q 1/02; H01Q 1/08; H01Q 1/12; H01Q 1/1228;
(Continued)

(56) References Cited

U.S. PATENT DOCUMENTS 6,670,917 B1   12/2003  Maniscalco et al.
2007/0246618 A1*  10/2007  Choi ................. F16M 11/2092
                                                        248/125.2
(Continued)

FOREIGN PATENT DOCUMENTS

CN    105101481 A    11/2015
JP    H09-232831 A    9/1997
(Continued)

OTHER PUBLICATIONS

International Search Report for PCT/KR2017/000644, dated Apr. 18, 2017 and its English translation.
(Continued)

*Primary Examiner* — Hai V Tran
(74) *Attorney, Agent, or Firm* — Insight Law Group, PLLC; Seung Lee

(57) ABSTRACT

A base station apparatus of an antenna-integrated type for use in a mobile communication network, includes an enclosure configured to have electric and electronic devices for processing signals in receipt and to form at least a part of an exterior of the base station, and an antenna configured to be installed so as to be tiltable on one surface of the enclosure, to have an outer contour defined by a radome, to include at least one radiating element for transmitting and receiving a radio signal, and an enclosure fixing device configured to fixedly mount the enclosure to an external support, and an antenna fixing apparatus configured to fixedly install the antenna on the enclosure so that the antenna is adjustably tilted with respect to the enclosure.

4 Claims, 16 Drawing Sheets

Related U.S. Application Data continuation of application No. PCT/KR2017/000644, filed on Jan. 19, 2017.

(51) Int. Cl.

| | | |
|---|---|---|
| *H01Q 1/02* | (2006.01) | |
| *H01Q 1/08* | (2006.01) | |
| *H01Q 1/24* | (2006.01) | |
| *H01Q 1/42* | (2006.01) | |
| *H04Q 1/02* | (2006.01) | |
| *H04Q 1/08* | (2006.01) | |
| *H01Q 1/12* | (2006.01) | |

(52) U.S. Cl.
CPC ......... *H01Q 1/1228* (2013.01); *H01Q 1/1264* (2013.01); *H01Q 1/246* (2013.01); *H01Q 1/42* (2013.01); *H01Q 1/428* (2013.01); *H01Q 3/04* (2013.01); *H04Q 1/02* (2013.01); *H04Q 1/08* (2013.01)

(58) Field of Classification Search
CPC ........ H01Q 1/1264; H01Q 1/24; H01Q 1/246; H01Q 1/428; H01Q 1/42; H04Q 1/02; H04Q 1/08
USPC .......................................... 343/707
See application file for complete search history.

(56) References Cited

U.S. PATENT DOCUMENTS

| | | | | |
|---|---|---|---|---|
| 2010/0201590 | A1* | 8/2010 | Girard | H01Q 21/08 343/757 |
| 2011/0032158 | A1 | 2/2011 | Rodger et al. | |
| 2012/0280874 | A1 | 11/2012 | Kim et al. | |
| 2014/0333500 | A1* | 11/2014 | Moon | H01Q 21/08 343/758 |
| 2015/0380806 | A1 | 12/2015 | Wild | |
| 2016/0211576 | A1* | 7/2016 | Vassilakis | H01Q 1/1228 |
| 2016/0261030 | A1 | 9/2016 | Kim et al. | |
| 2016/0365618 | A1 | 12/2016 | Kim et al. | |
| 2017/0033446 | A1 | 2/2017 | Zhao et al. | |
| 2017/0237160 | A1 | 8/2017 | Kim et al. | |
| 2017/0271760 | A1 | 9/2017 | Moon et al. | |

FOREIGN PATENT DOCUMENTS

| | | |
|---|---|---|
| JP | 2001-292015 A | 10/2001 |
| JP | 2005-051409 A | 2/2005 |
| JP | 2008-103860 A | 5/2008 |
| JP | 2011-119812 A | 6/2011 |
| JP | 3185100 U | 8/2013 |
| KR | 10-2001-0010509 A | 2/2001 |
| KR | 10-2003-0069260 A1 | 8/2003 |
| KR | 10-0713202 B1 | 5/2007 |
| KR | 10-0797444 B1 | 1/2008 |
| KR | 10-1422125 B1 | 7/2014 |
| WO | 2005-062419 A1 | 7/2005 |

OTHER PUBLICATIONS

Office Action dated Jul. 30, 2019 for Japanese Application No. 2018-537807.
Office Action dated Jun. 11, 2020 from the Chinese Patent Office for Chinese Application No. 201780007515.6.
"Huawei WCDMA BTS3902E Base Station Products Overview", Huawei Technologies Co., Ltd, Feb. 22, 2014, https://wenku.baidu.com/view/a8458b23c5da50e2524d7f54.html?fr=search.
A restriction requirement dated Jan. 23, 2020 for U.S. Appl. No. 16/039,344.
A non-final office action dated Mar. 3, 2020 for U.S. Appl. No. 16/039,344.
A notice of allowance dated Sep. 18, 2020 for U.S. Appl. No. 16/039,344.

\* cited by examiner

ANTENNA-INTEGRATED BASE STATION APPARATUS AND ANTENNA FIXING EQUIPMENT OF MOBILE COMMUNICATION NETWORK

CROSS-REFERENCE TO RELATED APPLICATIONS

This application is a Divisional Application of U.S. application Ser. No. 16/039,344, filed on Jul. 19, 2018 (now pending), which is a Continuation of International Application No. PCT/KR2017/000644, filed on Jan. 19, 2017, which claims the benefit of and priority to Korean Patent Application No. 10-2016-0008310, filed on Jan. 22, 2016, the content of which are herein incorporated by reference in their entirety.

TECHNICAL FIELD

The present disclosure in some embodiments relates to a base station apparatus or a repeater apparatus (hereinafter collectively referred to as "base station apparatus") in a mobile communication such as a CDMA, GSM, third generation (3G), LTE or such network. More particularly, the present disclosure relates to an antenna-integrated base station apparatus and an antenna fixing apparatus.

BACKGROUND

A base station of a mobile communication system has been generally divided into a base station apparatus including various electric and electronic devices for processing transmit and receive signals, and an antenna apparatus for transmitting and receiving radio signals with at least one radiating element. The antenna apparatus is installed at a high position such as a building roof, a tower or a support column, and the base station apparatus is usually installed at a low position on the ground. The antenna and base station apparatuses may be connected in an arrangement to transmit and receive wireless signals and/or control signals to and from each other.

Recent downsizing and weight reduction achievements of the respective apparatuses for wireless signal processing have eased their tower installations, encouraging the provision of base station apparatuses with antenna built-in. At this time, the relevant antenna-integrated base station apparatus can be installed in its entirety on an outside support column of a building or the like. These antenna-integrated base station apparatuses can maximize utilization of space as a whole, and minimize losses due to the feeder cable for interconnecting between the base station apparatus and the antenna as commonly practiced in the art.

Meanwhile, an antenna (or an antenna-integrated base station apparatus) is typically installed on a support column or the like by an installation structure which can reposition and fix the antenna so as to have its posture tilted with an appropriate inclination for properly directing the antenna to the ground (that is, towards a service user on the ground). Such a structure is implemented by a bracket structure and/or a clamp structure for fixedly fastening the antenna to the support column. For example, a support bracket fixed to the support column is formed with a vertically arcuate guide hole (i.e., a slot formation), while an antenna bracket or the like is fastened by a bolt coupling structure for positional fixation, which is fixedly disposed in the relevant guide hole in a proper position. A prior art example of such antenna installation method is Korean Unexamined Publication No. 1020030069260 filed by LG Electronics Inc., titled Antenna System for A Mobile Communication Station, invented by KIM, Dae Su and AHN, Hong Jin, and published on Aug. 27, 2003.

In this manner, the installation structure of the antenna allows an operator to not only adjust the posture of the antenna as appropriate at the time of the initial installation, but also reposition it thereafter and when the radio wave environment changes.

DISCLOSURE

Technical Problem

However, installing the antenna by such method as disclosed in the aforementioned Korean Unexamined Publication No. 1020030069260 requires an operator first to adjust and hold the antenna posture at a desired inclination angle until the fixing bolt is fastened, troubling the operator of using the human power to hold the posture of the antenna throughout the bolt fastening procedure. In addition, during the operation of fastening the fixing bolt by the operator, the antenna tilt often deviates from the desired angle due to the rotational friction of the bolt, compelling the operator to perform the same operation again and again.

In addition, when installing the antenna-integrated base station apparatus, the size and weight of the fixing component for installing the base station apparatus proportionally add to the apparatus' own size and weight, worsening the difficulty of the installation work.

Further, it is typical that the antenna (and the antenna-integrated base station apparatus) be installed at a high position such as on a roof or an exterior wall of a building, a street lamp, in a spire, etc., which requires an operator to use a crane or a rope for work-at-height to perform, further elevating the difficulty level of the same work done on the ground. Particularly, the operator utilizing work tools may cause casualties and damage to property from being struck with inadvertently dropped tools.

On the other hand, an antenna-integrated base station apparatus may be equipped with a global positioning system (GPS) device. In principle, to optimize the performance of the built-in GPS antenna, the GPS device is installed externally of the base station apparatus so as to have an upright posture facing towards the sky.

When tilting and installing an antenna-integrated base station apparatus equipped with such a GPS device, the installation angle of the GPS device tends to deviate from the optimum position. Accordingly, there is a need for an arrangement for installing an antenna-integrated base station apparatus, taking account of the installation angle of GPS equipment.

In consideration of the above issues, the present disclosure in at least some embodiments aims to provide an antenna-integrated base station apparatus and an antenna fixing apparatus, which enhance the installability and work time reduction.

Further, the present disclosure in at least some embodiments aims to provide an antenna-integrated base station apparatus and an antenna fixing apparatus with self-adjustment to their own optimum installation angles, while allowing a GPS device to be installed in its optimally angled position.

Summary

According to some aspects of the present disclosure, a base station apparatus of an antenna-integrated type for use in a mobile communication network, includes an enclosure, an antenna, an enclosure fixing device, an enclosure and an antenna fixing apparatus. The enclosure is configured to have electric and electronic devices for processing signals in receipt and to form at least a part of an exterior of the base station. The antenna is configured to be installed so as to be tiltable on one surface of the enclosure, to have an outer contour defined by a radome, to include at least one radiating element for transmitting and receiving a radio signal. The enclosure fixing device is configured to fixedly mount the enclosure to an external support. The antenna fixing apparatus is configured to fixedly install the antenna on the enclosure so that the antenna is adjustably tilted with respect to the enclosure.

The antenna fixing apparatus may include a dial knob configured to be installed externally of the radome, a gear structure configured to make a helical or rotational movement in response to a rotation of the dial knob, a linear movement mechanism configured to linearly move in engagement with the gear structure, and a linkage mechanism configured to secure the linear movement mechanism to the enclosure.

The antenna fixing apparatus may include a dial knob configured to be installed externally of the radome, a rotating rod configured to turn in response to a rotation of the dial knob, and to be formed with a gear arrangement, a movable block configured to have a gear structure that meshes with the gear arrangement of the rotating rod, and to linearly move in a sliding manner when the rotating rod turns, and a linkage mechanism configured to establish a linkage between the movable block and at least one hinge member that is fixedly mounted to one side of the enclosure.

The dial knob may be installed at an upper middle portion of the radome. The rotating rod may be formed with a screw gear arrangement. The movable block may have a gear structure in the form of a nut that meshes with the screw gear arrangement.

The dial knob may be installed on a lateral side of the radome. The rotating rod may be formed with a rotating gear structure. The movable block may have a linear gear structure in mesh with the rotating gear structure.

The linkage mechanism may include a link configured to interlink between at least one upper hinge member that is fixed to an upper portion of the enclosure and the movable block. Pivotable joints may be formed by link pins between the link and the upper hinge member of the enclosure, and between the link and the movable block, respectively. The enclosure may be formed, at a front lower portion, with at least one lower hinge member. The radome may be correspondingly formed with a hinge member for hinged connection with the at least one lower hinge member.

According to some other aspects of the present disclosure, an antenna fixing apparatus of base station in a mobile communication network, includes a dial knob, a rotating rod, a movable block and a linkage mechanism. The dial knob is configured to be installed externally of a radome of an antenna. The rotating rod is configured to turn in response to a rotation of the dial knob, and to be formed with a gear arrangement. The movable block is configured to have a gear structure that meshes with the gear arrangement of the rotating rod, and to linearly move in a sliding manner when the rotating rod turns. The linkage mechanism is configured to establish a linkage between the movable block and at least one hinge member formed on a bracket for installing the antenna on an external support.

The at least one hinge member of the bracket may include an upper hinge member formed on a first upper bracket that is subordinate to the bracket, and a lower hinge member formed on a second lower bracket that is subordinate to the bracket. The linkage mechanism may include a link that interconnects between the upper hinge member of the bracket and the movable block. Pivotable joints may be formed by link pins between the link and the upper hinge member of the bracket, and between the link and the movable block, respectively. The radome may be correspondingly formed with a hinge member for hinged connection with the at least one lower hinge member of the second lower bracket.

Advantageous Effects

As described above, the antenna-integrated base station apparatus of the mobile communication network, and the antenna fixing apparatus therefor according to some embodiments of the present disclosure are structured to maintain the state in which the base station apparatus stands upright in the vertical direction, and to render the antenna to be exclusively angularly adjustable, and thereby enhance the installability and work time reduction. Moreover, this obviates the need for the installer to use a separate tool for adjusting the installation angle, improves the convenience of the angle adjustment operation while shortening the operation time, and provides more accurate angular adjustments.

Further, the ability to install the base station apparatus in an upright posture allows a GPS device to be installed in its optimally angled position, and at the same time, permits an independent adjustment of the installation angle of the antenna into the optimum installation angle.

BRIEF DESCRIPTION OF THE DRAWINGS

Some embodiments of the present disclosure will now be described in detail with reference to the accompanying drawings.

DETAILED DESCRIPTION

In the following description, specific expressions are presented with particular details such as specific structural elements, but they are provided to aid in a more general understanding of the present disclosure, and it will be obvious to one of ordinary skill in the art that these specific matters can be subject to certain modifications or changes within the range of the present disclosure.

Figure 1A:
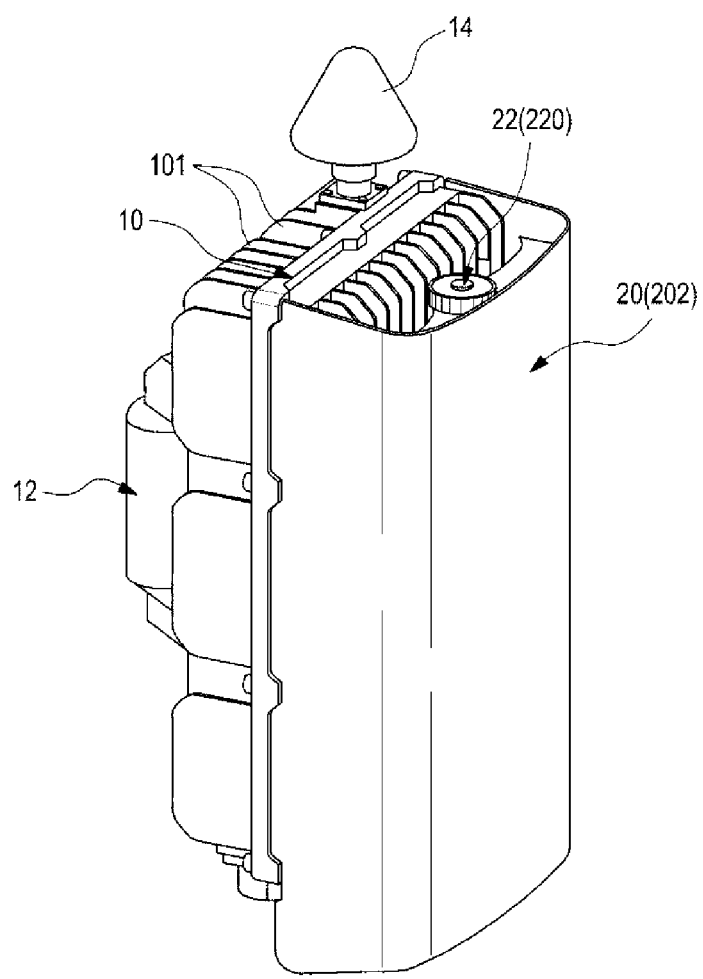
FIGS. 1A to 1F are external structural views of an antenna-integrated base station apparatus of a mobile communication network, according to a first embodiment of the present disclosure.
Figure 1B:
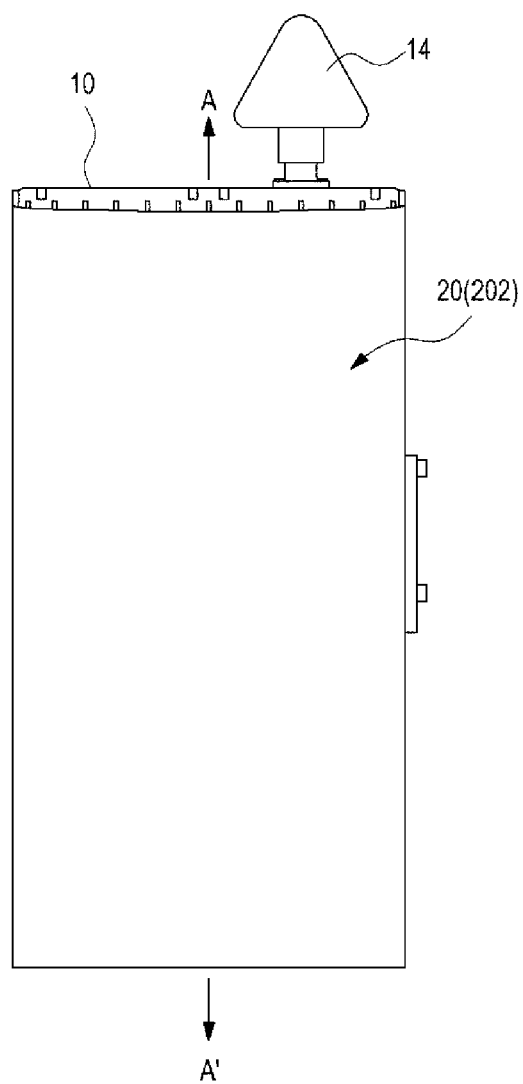
Figure 1C:
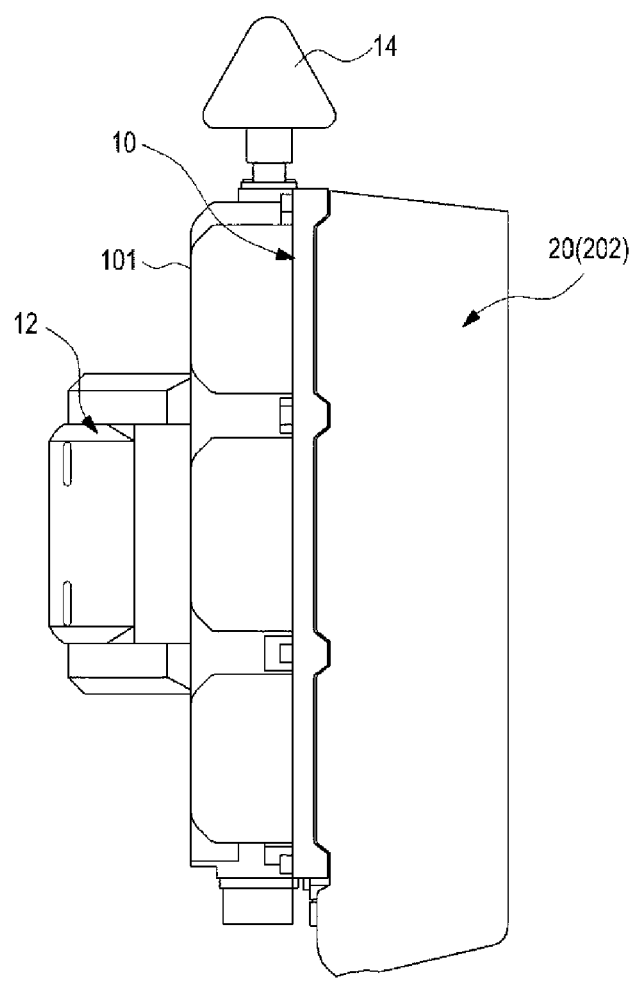
Figure 1D:
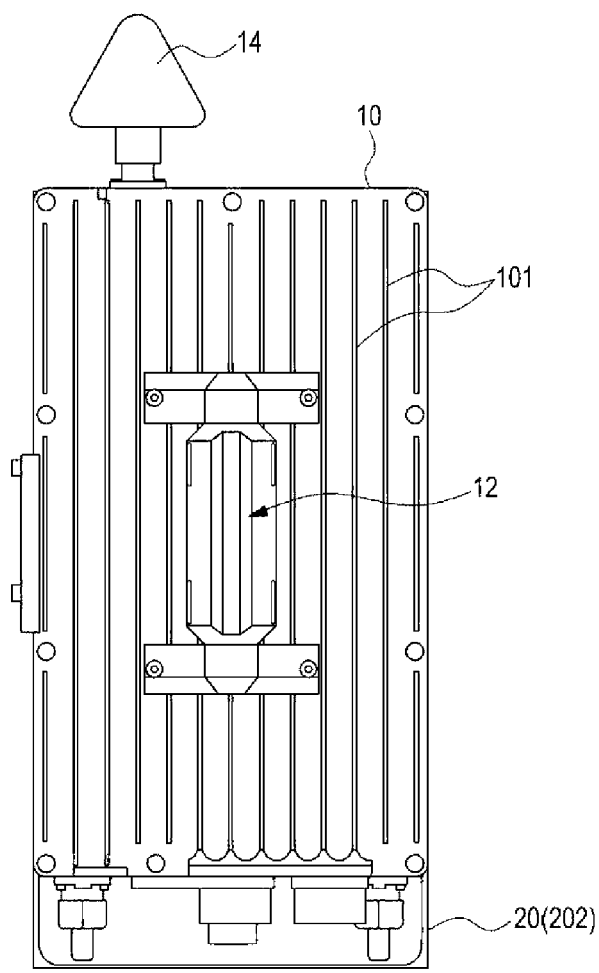
Figure 1E:
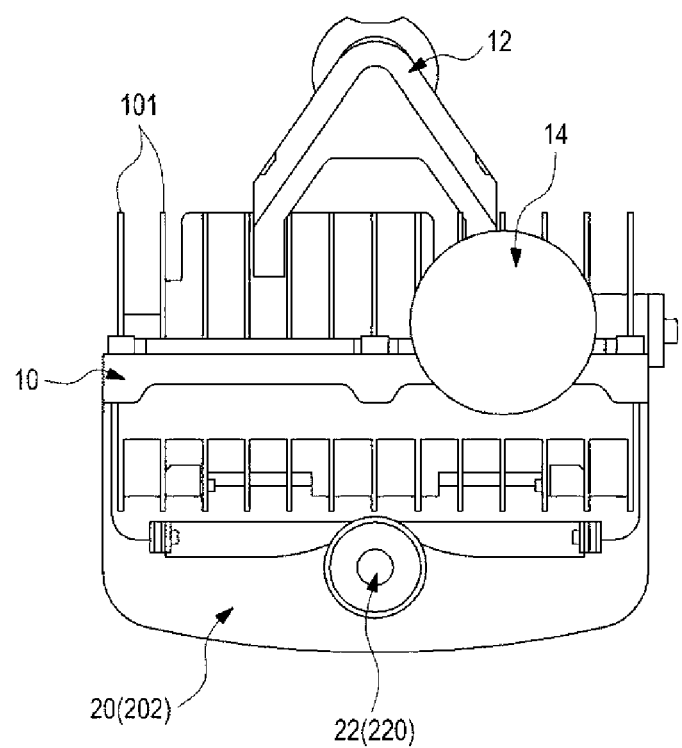
Figure 1F:
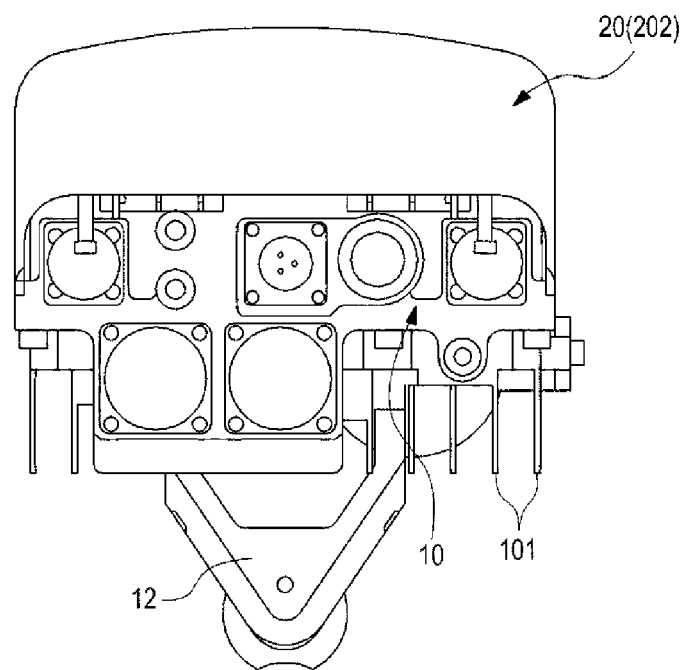

FIGS. 1A to 1F are external structural views of an antenna-integrated base station apparatus of a mobile communication network, according to a first embodiment of the present disclosure, wherein FIG. 1A is a perspective view of one side thereof, FIG. 1B a front view, and FIG. 1C a side view, FIG. 1D a rear view, FIG. 1E a top view, and FIG. 1F a bottom view.

Referring to FIGS. 1A to 1F, the antenna-integrated base station apparatus according to the first embodiment of the present disclosure includes an enclosure 10 and an antenna 20. The enclosure 10 houses various electrical and electronic devices for processing signals in receipt, and it forms at least a part of the exterior of the relevant base station apparatus. The antenna 20 is tiltably fixed on one surface (i.e., the front surface) of the enclosure 10, and it is equipped with at least one radiating element housed therein for transmitting and receiving radio signals.

On its front and rear exterior surfaces, the enclosure 10 may formed integrally with a plurality of radiation fins 101 for heat emission. Further, on the rear surface of the enclosure 10, an enclosure fixing device 12 such as a bracket is installed to fixedly mount the enclosure 10 on a support (not shown) such as an external support column. The enclosure fixing device 12 may have a simple structure in which the enclosure 10 is installed, for example, in an upright posture so as to be fixed without inclination. On the upper surface of the enclosure 10, a GPS device 14 may be mounted so that it is fixedly installed upright on top without inclination.

The antenna 20 may be provided therein with at least one radiating element (not shown), and it may have its outer contour defined by a radome 202 forming the outer contour of the antenna 20. The radiating element provided in the radome 20 may be, for example, a patch type radiating element implemented in a PCB structure for miniaturization thereof, although a dipole type or other various types of radiating elements may be also provided. A dipole type radiating element would have the installation space extended thicknesswise corresponding to the height of the radiating element, which needs to be reflected in determining the thickness of the radome 202 at the corresponding portion for accommodating the radiating element.

Figure 4:
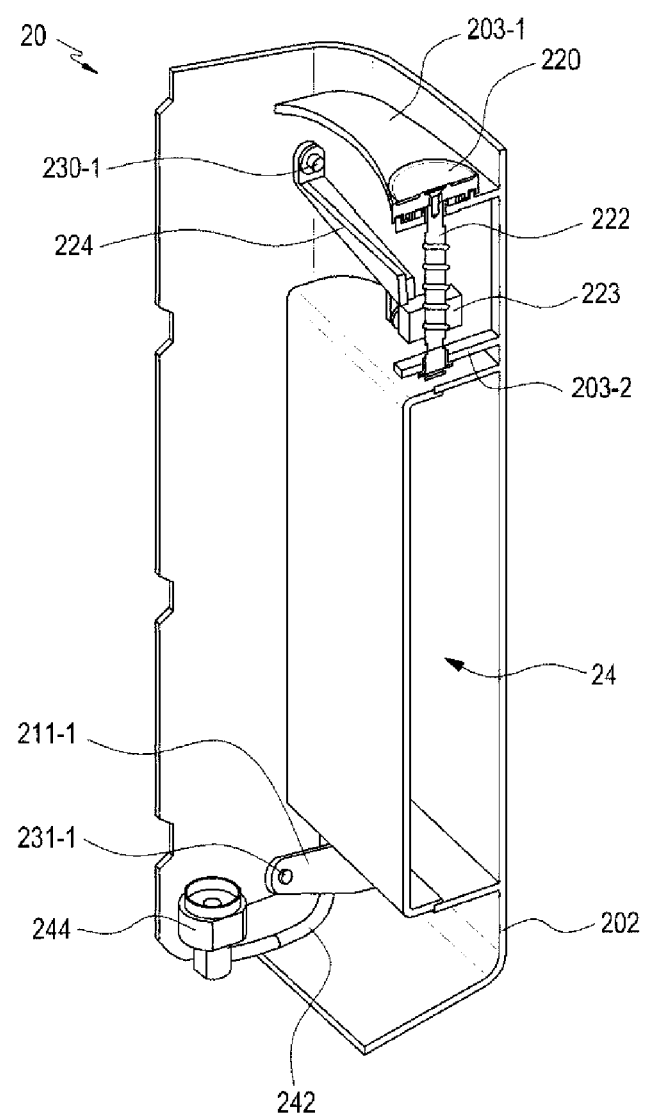
FIG. 4 is a perspective view of the antenna alone shown in FIG. 3A.

Meanwhile, the enclosure 10 (thus the electronic devices inside) and the antenna 20 (with the radiating elements inside) may be interconnected by an appropriate connector (e.g., at 244 in FIG. 4) and a cable (e.g., at 242 in FIG. 4).

Further, on the rear face of the radome 202 of the antenna 20, an antenna fixing apparatus 22 is provided for installing the radome 202 so as to be fixed while being tiltable from the front face of the enclosure 10. The antenna fixing apparatus 22 has a dial knob 220 which receives a rotation operation of an installer, and a mechanism (not shown) for changing the angle of the tilt of the radome 202 (as a result, the tilt of the antenna) by pivoting the radome 202 in response to a rotation of the dial knob 220 about an axis while otherwise holding the radome 202 in place. Such mechanism may be implemented by such structures as a gear structure that makes helical or rotational movement in response to the rotation of the dial knob 220, a linear movement mechanism that linearly moves in engagement with the gear structure, and a linkage mechanism for securing the linear movement mechanism to the enclosure 10.

Figure 2A:
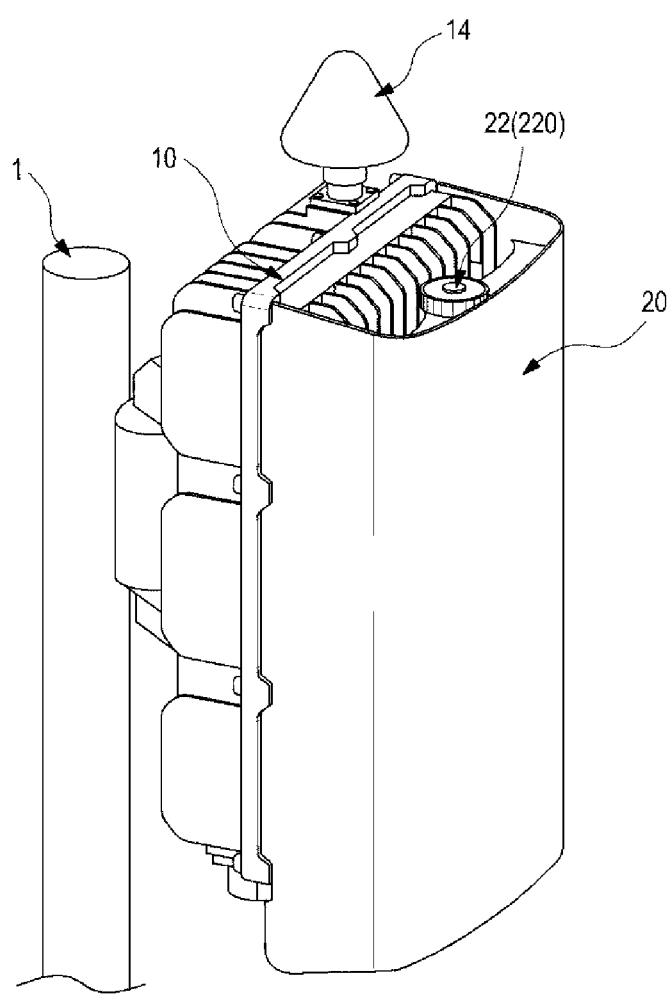
FIGS. 2A and 2B are perspective views of the installed state of the antenna-integrated base station apparatus shown in FIGS. 1A to 1F.
Figure 2B:
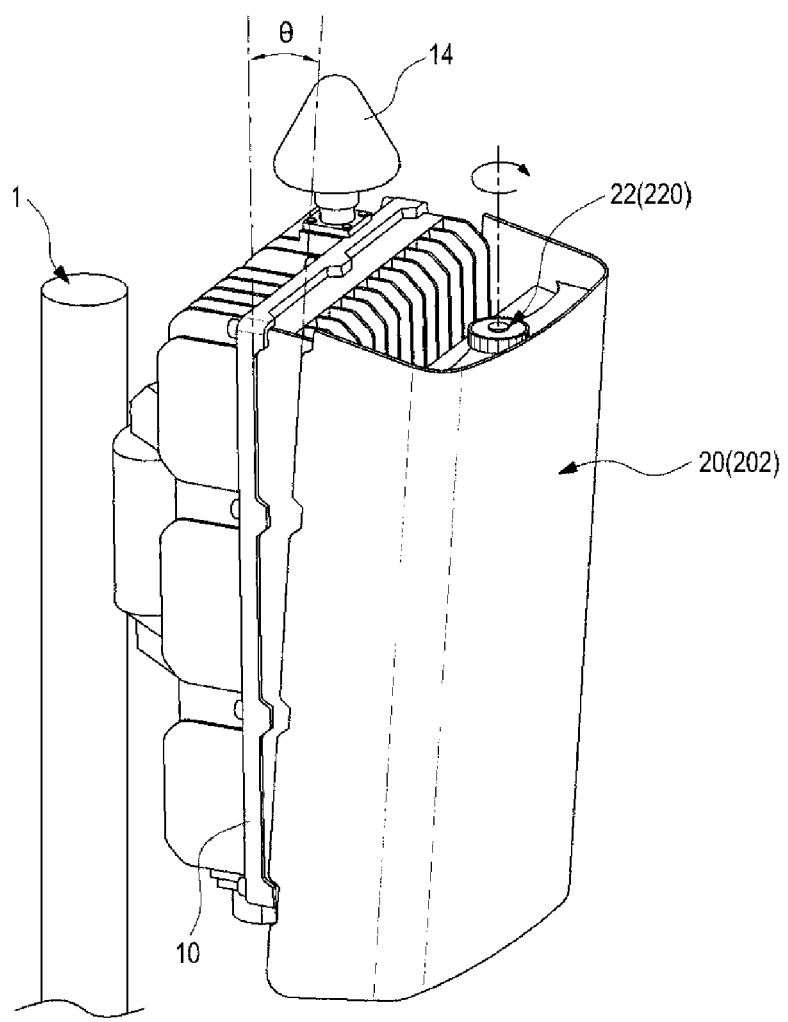

FIGS. 2A and 2B are perspective views of the installed state of the antenna-integrated base station apparatus shown in FIGS. 1A to 1F. FIG. 2A shows the initially installed state of the apparatus, and FIG. 2B shows the state of installation after an installer operated the antenna fixing apparatus 22. As shown in FIG. 2A, the enclosure 10 of the base station apparatus may be fixedly installed on a support column 1 by the enclosure fixing device 12. At this time, when the installer rotates the dial knob 220 of the antenna fixing apparatus 22 as shown by the rotational arrow in FIG. 2B, the antenna 20 is inclined by an angle (θ) corresponding to the rotational operation of the dial knob 220, while the enclosure 10 remains fixed.

As structured in the above description, according to the present disclosure, the base station apparatus and the GPS device 14 installed in the base station apparatus can remain standing upright, while the antenna 20 alone can be separately adjusted angularly. Further, the installer needs no special tool or support for the base station apparatus for making adjustments to the installation angle of the antenna 20, which is performed by operating the dial knob 220 of the antenna fixing apparatus 22.

At this time, the maximum rotatable angle of the antenna 20 by the antenna fixing apparatus 22 can be realized at, for example, about 5 to 15 degrees.

Figure 3A:
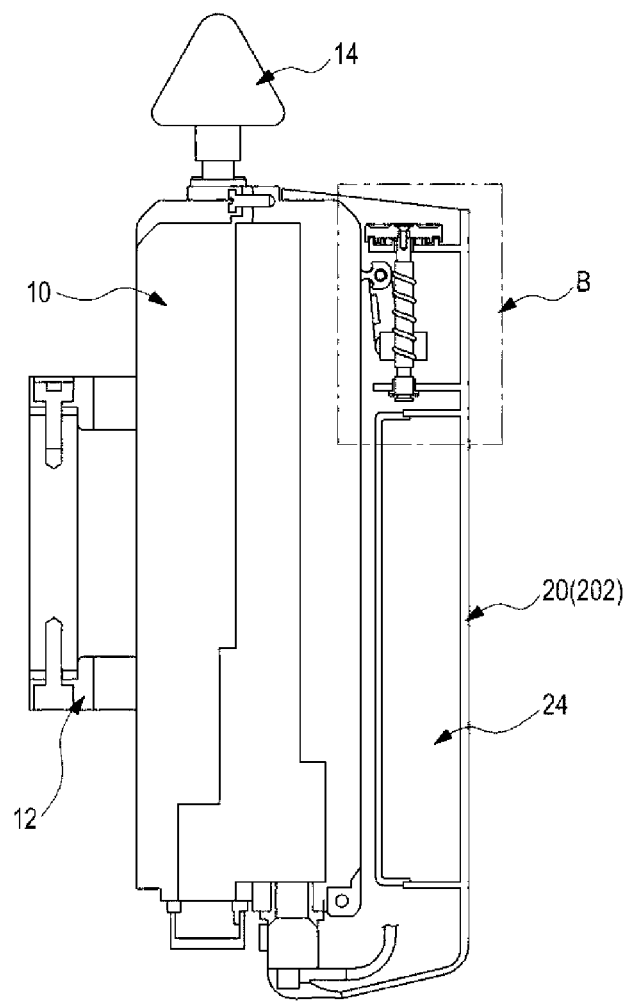
FIG. 3A is a cross-sectional view along line A-A' shown in FIG. 1B.
Figure 3B:
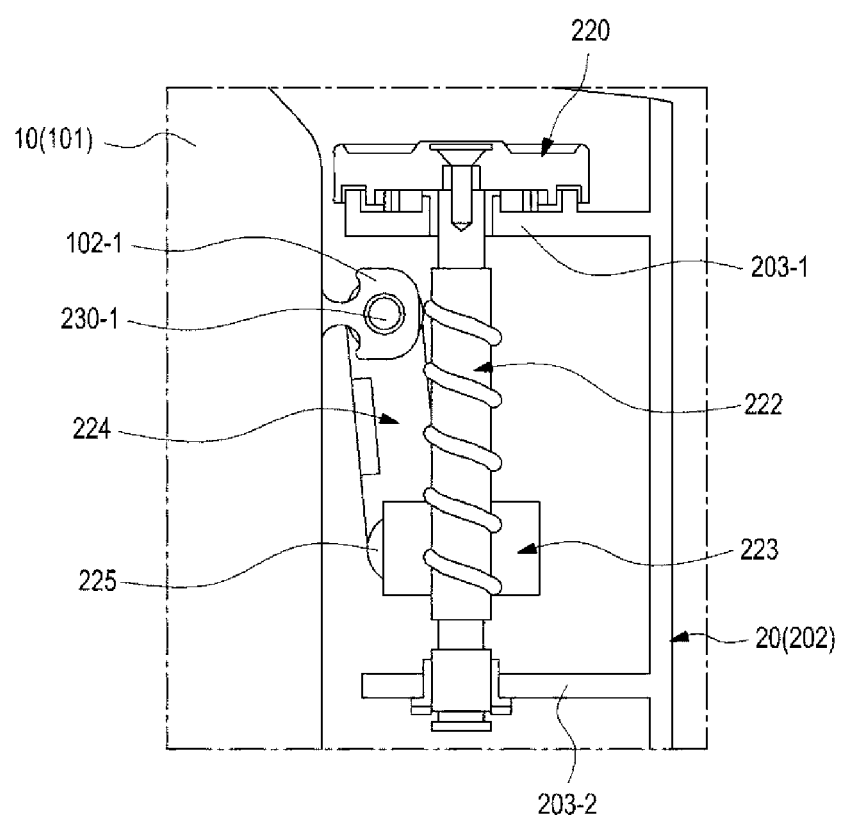
FIG. 3B is an enlarged view of portion B of FIG. 3A.
Figure 5:
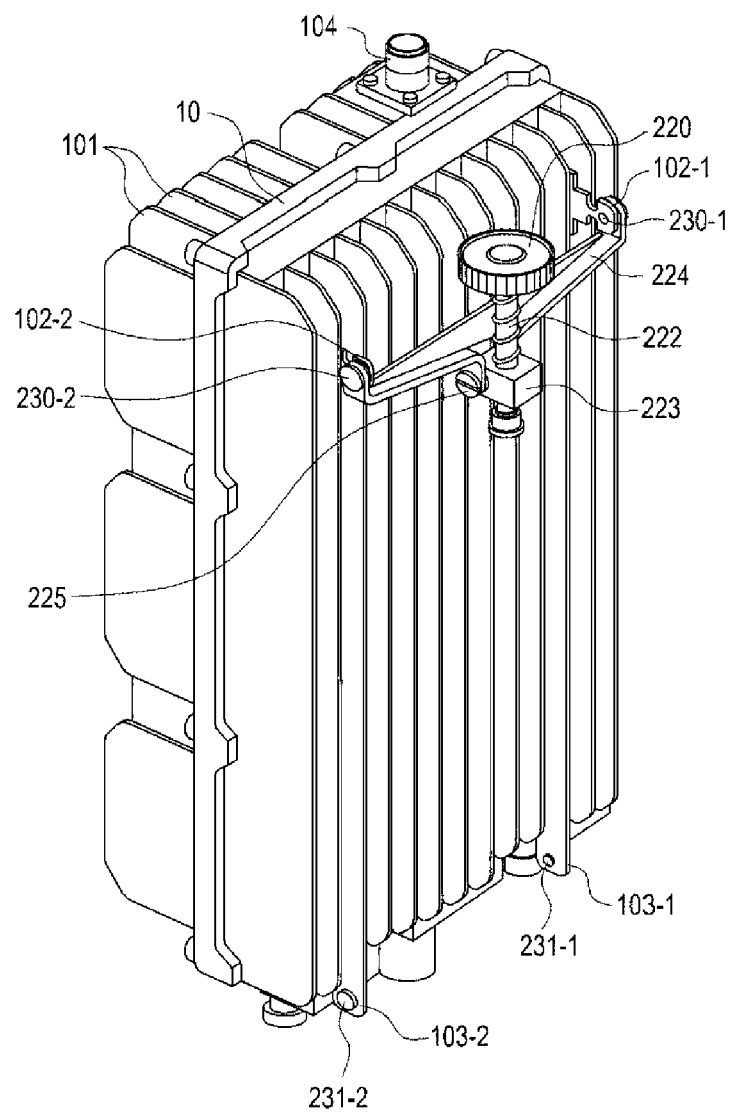
FIG. 5 is a perspective view showing just the enclosure of the base station apparatus of FIGS. 1A to 1F, and the antenna fixing apparatus capable of adjusting the installation angle.
Figure 6:
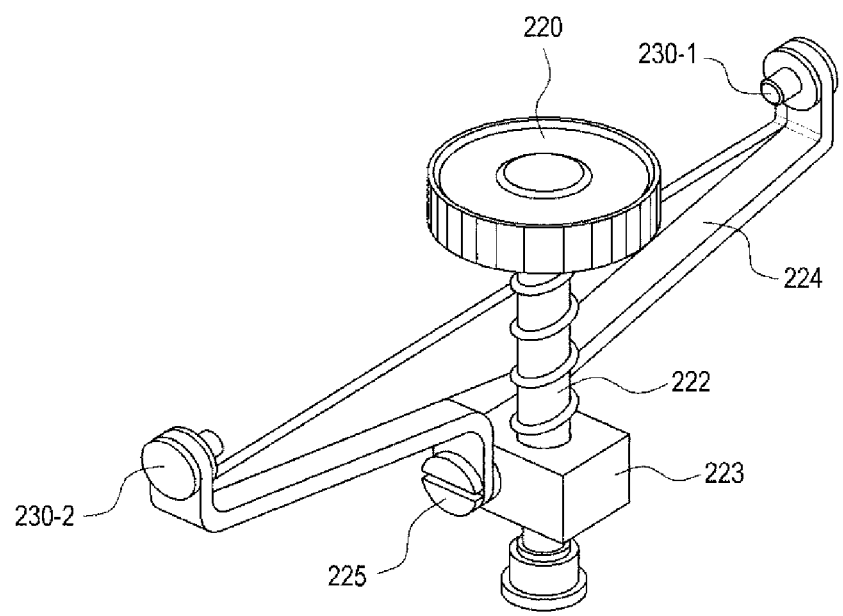
FIG. 6 is an enlarged perspective view of the antenna fixing apparatus of FIG. 5.

FIG. 3A is a cross-sectional view along line A-A' shown in FIG. 1B, and FIG. 3B is an enlarged view of portion B of FIG. 3A. FIG. 4 is a perspective view of the antenna alone shown in FIG. 3A. For convenience in describing the embodiments, FIGS. 3A to 4 omit various devices which can be installed inside the enclosure, and radiating elements and the like provided inside the antenna. FIG. 5 is a perspective view showing just the enclosure of the base station apparatus of FIGS. 1A to 1F, and the antenna fixing apparatus capable of adjusting the installation angle. FIG. 6 is an enlarged perspective view of the antenna fixing apparatus of FIG. 5. On the other hand, the enclosure 10 as in FIG. 5 shows a state in which the GPS device 14 has been removed (not yet attached), yet illustrating a connector 140 which is installed on the upper side of the enclosure 10 for mounting the GPS device 14. Hereinafter, with reference to FIGS. 3A to 6, the structure of the antenna fixing apparatus 22 will be described in more detail.

The antenna fixing apparatus 22 may include the dial knob 220 installed for operation by an installer at an appropriate position outside the radome 202, for example, in the middle of the upper surface of the radome 202, and a rotating rod 222 that is rotated in response to the rotation of the dial knob 220 and is formed with, for example, a screw gear arrangement. The dial knob 220 and the rotating rod 222 may be supportedly mounted to be rotatable by mountings 203-1 and 203-2 each formed in a proper shape on the rear side of the radome 202. Here, the dial knob 220 and/or the mounting 203-1 where the dial knob 220 is installed may be both formed or printed with appropriate scale marks or other various forms of signs for the installer to recognize the rotation amount of the dial knob 220 more easily.

Further, the antenna fixing apparatus 22 includes a movable block 223, having a gear structure in the form of a nut that meshes with the screw gear arrangement of the rotating rod 222, to linearly move in a sliding manner when the rotating rod 222 turns. The antenna fixing apparatus 22 also includes a linkage mechanism that establishes a linkage between the movable block 223 and, for example, a couple of upper hinge members 102-1, 102-2 fixedly mounted to proper upper portions in the front of the enclosure 10. The screw gear arrangement of the rotating rod 222 is formed with a male thread having a constant pitch, while the movable block 223 has a female thread with a pitch value corresponding to that of the screw gear arrangement. The pitch value of the screw gear arrangement of the rotating rod 222 and the corresponding pitch value of the female thread of the movable block 223, are appropriately set so as to have coarser threads than the ordinary gear structure, in order to minimize the influence of foreign matter such as dust while allowing a smooth movement of the movable block 223 by the rotation of the screw gear.

The linkage mechanism is mainly composed of a link 224 of an appropriate shape for interlinking between the upper hinge members 102-1, 102-2 of the enclosure 10 and the movable block 223. Pivotable joints are formed by link pins 230-1, 230-2, 225 between the link 224 and the upper hinge members 102-1, 102-2 of the enclosure 10, and between the link 224 and the movable block 223, respectively.

Meanwhile, the enclosure 10 is formed, at its appropriate front lower portions, with lower hinge members (reference numerals 103-1 and 103-2 in FIG. 5), while the radome 202 is formed with hinge members (reference numeral 211-1 in FIG. 4) for hinged connection with the lower hinge members 103-1, 103-2 at their corresponding positions. The lower hinge members 103-1, 103-2 of the enclosure 10 and the hinge members 211-1 of the radome 202 are pivotally interconnected by link pins 231-1, 231-2.

As to the principle of the angular adjustment of the antenna 20 by the antenna fixing apparatus 22 having the above-described configuration, the dial knob 220 is operated to turn the rotating rod 222, whereby the movable block 223 moves up and down. With the movable block 223 being connected by the link 224 to the upper side of the enclosure 10, and the lower side of the enclosure 10 being in hinged connection with the lower side of the antenna 20, the upward and downward movements of the movable block 223 cause the antenna 20 to pivot as a whole about the hinge connection between the enclosure 10 and the antenna 20. In other words, the distance between the upper side of the antenna 20 and the enclosure 10 is increased or decreased.

Figure 7:
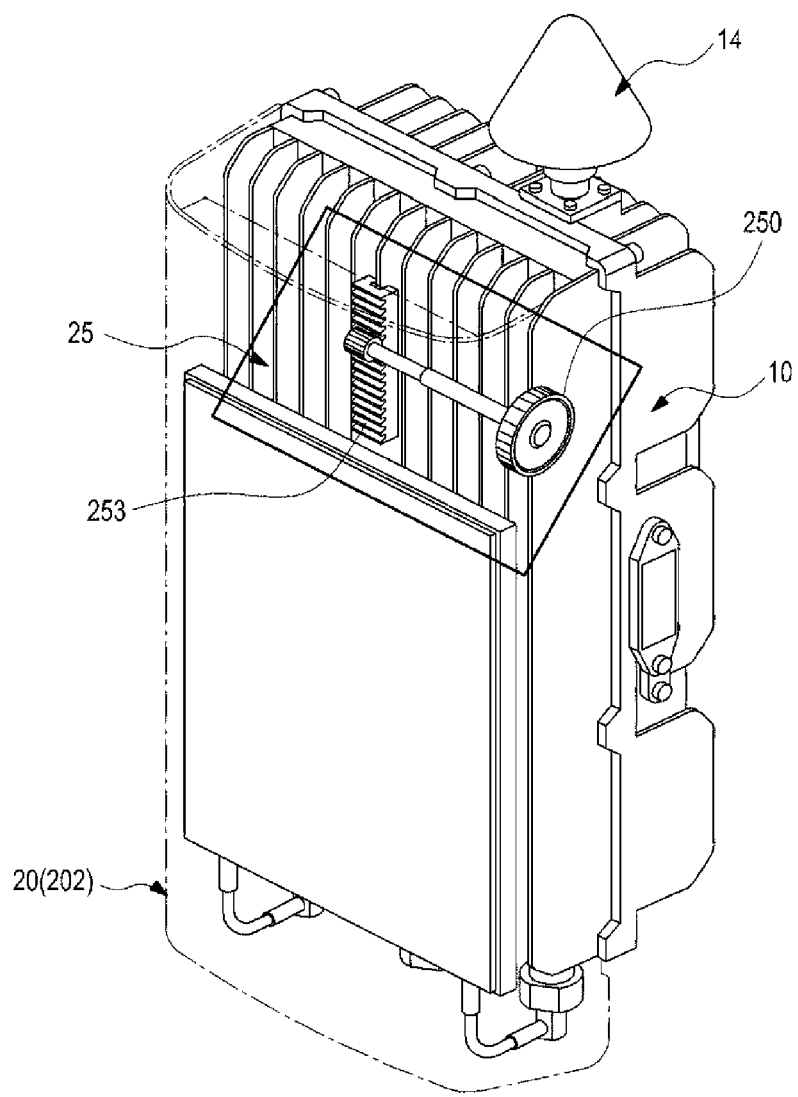
FIG. 7 is an external perspective view of an antenna-integrated base station apparatus of a mobile communication network, according to a second embodiment of the present disclosure.
Figure 8:
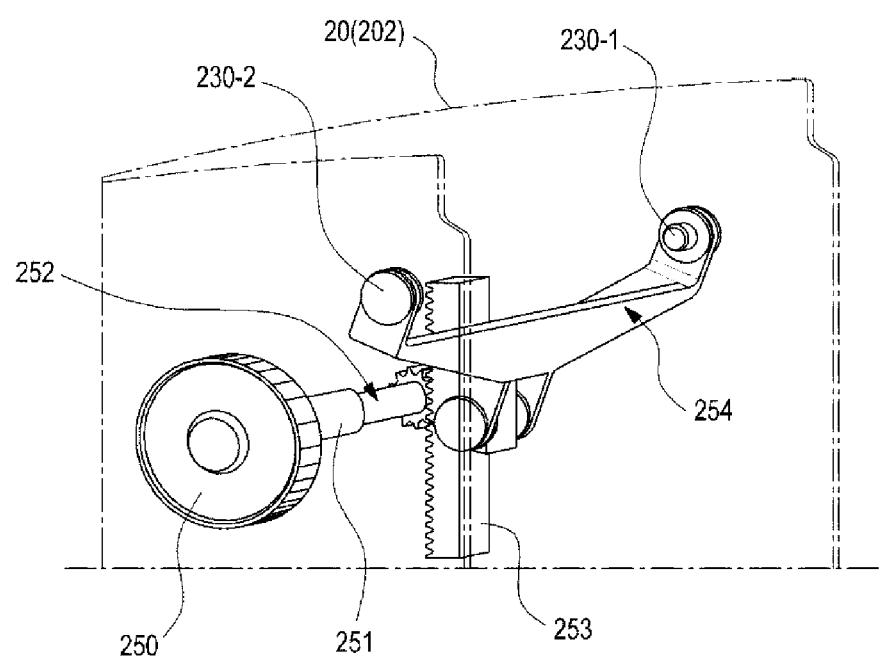
FIG. 8 is an enlarged perspective view of the antenna fixing apparatus of FIG. 7.

FIG. 7 is an external perspective view of an antenna-integrated base station apparatus of a mobile communication network, according to a second embodiment of the present disclosure. FIG. 8 is an enlarged perspective view of the antenna fixing apparatus of FIG. 7. In FIGS. 7 and 8, the antenna 20 is shown as being transparent for convenience of explanation, and FIG. 7 shows only a substantial part of the antenna fixing apparatus. As shown in FIGS. 7 and 8, the antenna-integrated base station apparatus according to the second embodiment of the present disclosure may include an enclosure 10 and an antenna 20 having almost the same structures as those of the first embodiment disclosed in the previous drawings. The basic difference from the first embodiment is, as shown in FIGS. 7 and 8, that an antenna fixing apparatus 25 for fixing the antenna 20 to the enclosure 10 is structured to have a dial knob 250 attached to a lateral side of the radome 202.

More specifically, the antenna fixing apparatus 25 according to the second embodiment of the present disclosure includes a dial knob 250 installed on the upper portion of one outer side of the radome 202, a rotating rod 251, and a movable block 253. The rotating rod 251 is rotated by the rotation of the knob 250 and is formed with, for example, with a rotating gear structure 252. The movable block 253, which has a linear gear structure in mesh with the rotating gear structure 252 of the rotating rod 251, moves linearly in a sliding manner when the rotating rod 251 turns. In other words, the gear coupling between the rotating gear structure 252 of the rotating rod 251 and the movable block 253 corresponds to the rack and pinion gear structure. As in the first embodiment, the movable block 253 is connected to the enclosure 10 via a linkage mechanism including a link 254.

The principle of angular adjustment of the antenna 20 by the antenna fixing apparatus 25 according to the second embodiment of the present disclosure is the same as in the first embodiment, which is to operate the dial knob 250 for turning the rotating rod 251 and accordingly move the movable block 253 up and down.

The configuration and operation of the antenna-integrated base station apparatus according to embodiments of the present disclosure can be implemented as described above, but on the other hand, besides the above description of the present disclosure presented with specific examples, variations thereof can be made without departing from the scope of the present disclosure. For example, in the above-described embodiments, the dial knob of the antenna fixing apparatus is installed on the upper side or the lateral side of the radome, although a structure is also envisioned that the dial knob is installed on the lower side of the radome.

Further, in the above description, it is mentioned that the maximum rotation angle of the antenna 20 by the antenna fixing apparatus 22 is about 5 to 15 degrees, although the rotation angle of the antenna can be implemented in a wide range beyond 15 degrees. Although the above description is directed to the structure in which the antenna is tilted towards the ground, the present disclosure in yet another embodiment envisions the antenna tilting towards the sky.

In the above description, the antenna fixing apparatus according to the embodiments of the present disclosure is applied to the antenna-integrated base station apparatus. However, in yet another embodiment of the present disclosure, the antenna fixing apparatus can be also installed on an antenna that is mounted separately from the base station apparatus. For example, independent of base station apparatuses for ground level installation, antennas to be mounted on the support stands such as support columns may be installed with mounting brackets which can be appropriately structured to incorporate the antenna fixing apparatus. Specifically, the bracket may be structured in part to be coupled with the support column, while it is structured in part (e.g., as a first upper side sub-bracket that is subordinate to the bracket) similar to the upper hinge members 102-1, 102-2 as shown in FIG. 5 to be connected with the linkage structure of the antenna fixing apparatus. In addition, the bracket may be structured in part to be coupled with the support column, while it is structured in part (e.g., as a second lower side sub-bracket) similar to the lower hinge members 103-1, 103-2 as shown in FIG. 5 to be in hinged connection with the hinge members of the radome of the antenna. Through the bracket having such a structure and the antenna fixing apparatus, the antenna can be installed on the support column separately from the base station apparatus. The remainder of the configuration of the antenna fixing apparatus may be similar to the structure of the first or second embodiment.

Figure 9:
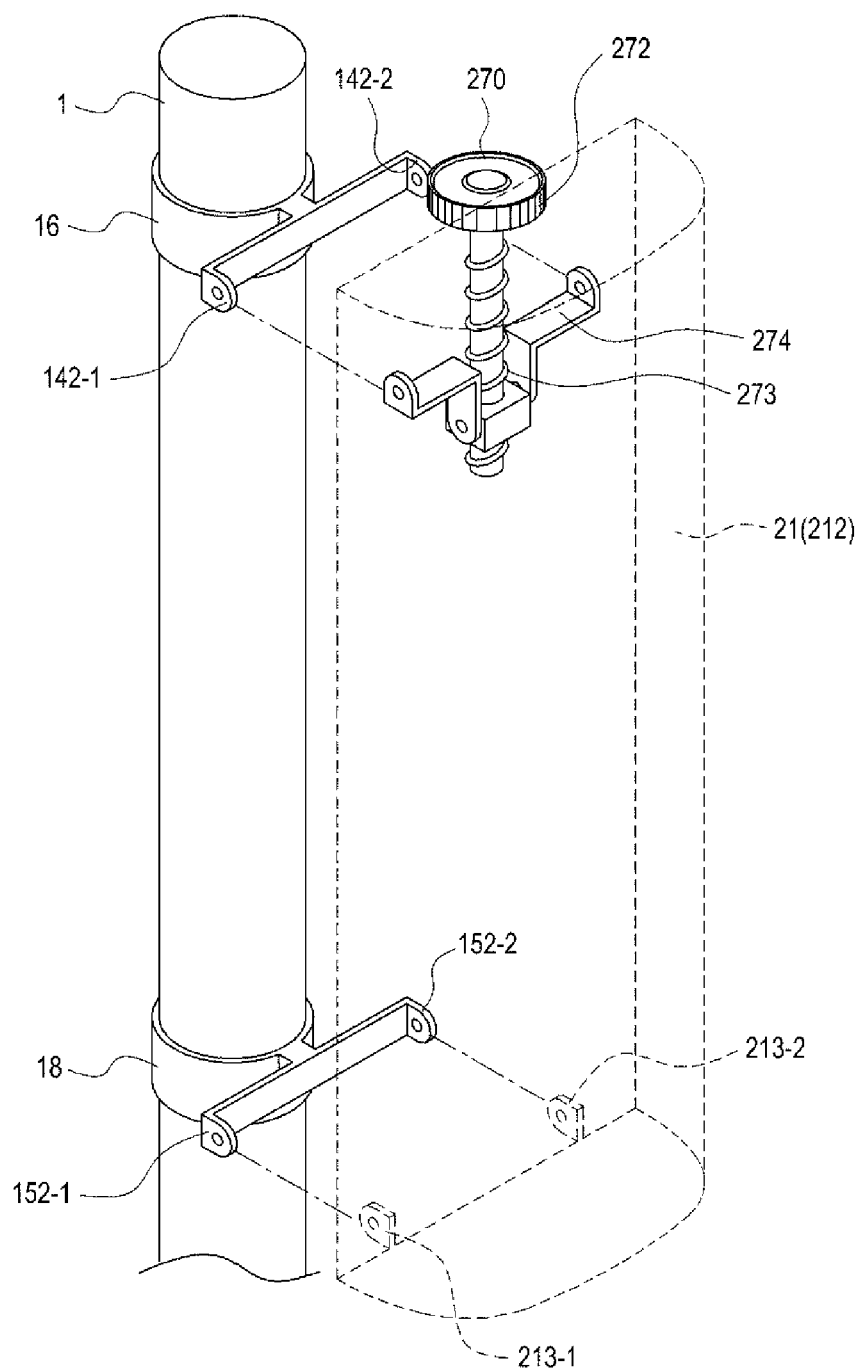
FIG. 9 is a perspective view of an antenna fixing apparatus of a base station in a mobile communication network, according to a third embodiment of the present disclosure.

FIG. 9 is a perspective view of an antenna fixing apparatus of a base station in a mobile communication network, according to a third embodiment of the present disclosure, illustrating an example antenna fixing apparatus that can be installed in an antenna 21 to be mounted on a support column 1 separately from a base station apparatus for ground level installation. FIG. 9 depicts the antenna 21 by dotted lines for convenience of explanation, with the antenna 21 detached from a bracket 16/18 on the support column 1.

Referring to FIG. 9, the antenna fixing apparatus according to the third embodiment of the present disclosure includes a dial knob 270, a rotating rod 272, a movable block 273 and a linkage mechanism 274. The dial knob 270 is installed externally of a radome 212 of the antenna 2. The rotating rod 272 turns in response to the rotation of the dial knob 270 and is formed with, for example, a gear arrangement. The movable block 273 has a gear structure that meshes with the gear arrangement of the rotating rod 272, and linearly moves in a sliding manner when the rotating rod 272 turns. The linkage mechanism 274 establishes a linkage between the movable block 273 and at least one hinge member formed on a bracket (e.g., a first sub-bracket 16) for installing the antenna 21 on a support such as the external support column 1.

The bracket for mounting the antenna 21 on the support column 1 may be implemented as two separate brackets including a first sub-bracket 16 located on the upper side, and a second sub-bracket 18 located on the lower side. The first sub-bracket 16 has upper hinge members 142-1 and 142-2, while the second sub-bracket 18 has lower hinge members 152-1 and 152-2. The upper hinge members 142-1, 142-2 of the first sub-bracket 16 are structured to be hinged to the linkage mechanism 272. In addition, the lower hinge members 152-1, 152-2 of the second sub-bracket 18 are hinged to hinge members 213-1, 213-2 formed on the radome 212 of the antenna 21.

Through the antenna fixing apparatus having the structure according to the third embodiment of the present disclosure shown in FIG. 9, the installer operates only the dial knob 270 of the antenna fixing apparatus, and thereby adjusts the installation angle of the antenna 21.

On the other hand, similar to the structure of the first embodiment of the present disclosure shown in FIGS. 2A to 6, the antenna fixing apparatus of the third embodiment of the present disclosure shown in FIG. 9 is installed on the upper surface of the antenna 21. In yet another embodiment of the present disclosure, the antenna fixing apparatus may be also structured to be installed on a lateral side of the antenna radome similar to the structure of the second embodiment shown in FIGS. 7 and 8. Such a structure may have the dial knob installed on the lateral side of the radome 212, the rotating rod provided with a rotating gear structure, and the movable block fitted with a linear gear structure that meshes with the rotating gear structure.

As described above, there are various modifications and changes available to the present disclosure, and therefore, the scope of the present disclosure is not defined by the embodiments described, but by the claims and the equivalence of the claims.

What is claimed is:

1. An antenna fixing apparatus of base station in a mobile communication network, the antenna fixing apparatus comprising:
   a dial knob which is installed outside a radome of an antenna;
   a rotating rod configured to rotate in response to a rotation of the dial knob, and to be formed with a gear arrangement;
   a movable block which has a gear structure that meshes with the gear arrangement of the rotating rod, and linearly moves in a sliding manner when the rotating rod turns; and
   a linkage mechanism which establishes a linkage between the movable block and at least one hinge member formed on a bracket for installing the antenna on an external support.

2. The antenna fixing apparatus of claim 1, wherein the dial knob is installed at an upper middle portion of the radome,
   the rotating rod is formed with a screw gear arrangement, and
   the movable block has a gear structure in the form of a nut that meshes with the screw gear arrangement.

3. The antenna fixing apparatus of claim 1, wherein the dial knob is installed on a lateral side of the radome,
   the rotating rod is formed with a rotating gear structure, and
   the movable block has a linear gear structure in mesh with the rotating gear structure.

4. The antenna fixing apparatus of claim 1, wherein the at least one hinge member of the bracket comprises an upper hinge member formed on a first upper bracket that is subordinate to the bracket, and a lower hinge member formed on a second lower bracket that is subordinate to the bracket,
   the linkage mechanism comprises a link that interconnects between the upper hinge member of the bracket and the movable block,
   pivotable joints are formed by link pins between the link and the upper hinge member of the bracket, and between the link and the movable block, respectively, and
   the radome is correspondingly formed with a hinge member for hinged connection with the at least one lower hinge member of the second lower bracket.

* * * * *